(12) United States Patent
Wheatley, III et al.

(10) Patent No.: US 7,130,334 B2
(45) Date of Patent: *Oct. 31, 2006

(54) METHOD AND APPARATUS FOR A PILOT SEARCH USING A MATCHED FILTER

(75) Inventors: Charles E. Wheatley, III, Del Mar, CA (US); John E. Maloney, San Diego, CA (US)

(73) Assignee: Qualcomm, Inc., San Diego, CA (US)

( * ) Notice: Subject to any disclaimer, the term of this patent is extended or adjusted under 35 U.S.C. 154(b) by 330 days.

This patent is subject to a terminal disclaimer.

(21) Appl. No.: 10/759,981

(22) Filed: Jan. 16, 2004

(65) Prior Publication Data

US 2004/0146126 A1    Jul. 29, 2004

Related U.S. Application Data

(63) Continuation of application No. 09/450,265, filed on Nov. 29, 1999, now Pat. No. 6,760,366.

(51) Int. Cl.
*H04B 1/69* (2006.01)
(52) U.S. Cl. .................. 375/152; 375/143; 375/343; 370/341
(58) Field of Classification Search ................ 375/142, 375/143, 147, 150, 152, 343; 370/341, 342
See application file for complete search history.

(56) References Cited

U.S. PATENT DOCUMENTS

| | | | |
|---|---|---|---|
| 4,550,414 A | 10/1985 | Guinon et al. | |
| 4,901,307 A | 2/1990 | Gilhousen et al. | |
| 5,031,193 A | 7/1991 | Atkinson et al. | |
| 5,103,459 A | 4/1992 | Gilhousen et al. | |
| 5,109,390 A | 4/1992 | Gilhousen et al. | |
| 5,490,165 A | 2/1996 | Blakeney et al. | |
| 5,627,855 A | 5/1997 | Davidovici | |
| 5,640,425 A | 6/1997 | Kanterakis | |
| 5,715,276 A | 2/1998 | Tran et al. | |
| 5,719,898 A | 2/1998 | Davidovici et al. | |
| 5,742,637 A | 4/1998 | Kanterakis et al. | |
| 5,764,691 A | 6/1998 | Hennedy et al. | |
| 5,784,466 A | 7/1998 | Whitecar et al. | |

(Continued)

FOREIGN PATENT DOCUMENTS

EP    0721264 A1    7/1996

(Continued)

OTHER PUBLICATIONS

Sklar, "Digital Communications Fundamental and Applications," Printice Hall, 1998, pp. 91, 92, 138-140.

(Continued)

*Primary Examiner*—Temesghen Ghebretinsae
(74) *Attorney, Agent, or Firm*—Philip Wadsworth; Sandra L. Godsey; Lee Hsu

(57) ABSTRACT

The present invention includes a cellular pilot signal detector or searcher for use in a cellular mobile communications unit. The signal detector uses a matched filter to detect a pilot signal transmitted from a cellular base station. The matched filter includes a plurality of taps and a plurality of delays located between adjacent taps. The signal components of a received digital signal are held on the taps of the matched filter by the delays. The matched filter compares the signal components of the received signal to an expected or searched for digital pattern. The matched filter puts out a relatively large signal if the received digital signal matches the expected digital pattern. The matched filter can also be used in parallel with a correlator.

6 Claims, 6 Drawing Sheets

U.S. PATENT DOCUMENTS

| | | |
|---|---|---|
| 5,802,102 A | 9/1998 | Davidovici |
| 5,859,870 A | 1/1999 | Tsujimoto |
| 5,862,133 A | 1/1999 | Schilling |
| 5,864,578 A | 1/1999 | Yuen |
| 5,950,131 A | 9/1999 | Vilmur |
| 6,067,292 A | 5/2000 | Huang et al. |
| 6,075,808 A | 6/2000 | Tsujimoto |
| 6,160,803 A | 12/2000 | Yuen et al. |
| 6,163,566 A | 12/2000 | Shiino |
| 6,266,361 B1 | 7/2001 | Huang et al. |
| 6,275,545 B1 | 8/2001 | Suzuki |
| 2001/0048713 A1* | 12/2001 | Medlock et al. ............ 375/150 |

FOREIGN PATENT DOCUMENTS

| | | |
|---|---|---|
| EP | 0757450 | 2/1997 |
| EP | 0757450 A2 | 2/1997 |
| EP | 0810741 | 12/1997 |
| EP | 0838910 | 4/1998 |
| WO | 9900912 | 1/1999 |

OTHER PUBLICATIONS

Omura et al., "Spread Spectrum Communications Handbook," McGraw-Hill, Revised Edition, 1994, pp. 8-15, 117, 816-822.

* cited by examiner

METHOD AND APPARATUS FOR A PILOT SEARCH USING A MATCHED FILTER

CLAIM OF PRIORITY UNDER 35 U.S.C. §120

The present Application for Patent is a Continuation and claims priority to patent application Ser. No. 09/450,265, entitled "METHOD AND APPARATUS FOR A PILOT SEARCH USING A MATCHED FILTER" filed Nov. 29, 1999 now U.S. Pat. No. 6,760,366, now allowed, and assigned to the assignee hereof and hereby expressly incorporated by reference herein.

BACKGROUND

1. Field

The present invention is related to detection of pilot signals by a digital cellular communications mobile unit. Specifically, the present invention relates to a method and apparatus of using a matched filter in a digital cellular communications mobile unit to search for and detect pilot signals generated by cellular base stations.

2. Background

In a code division multiple access (CDMA) spread spectrum communication system, a shared frequency band is used for communication with all base stations within that system. An example of such a system is described in the TIA/EIA Standard TIA/EIA-95-B entitled "Mobile Station-Base Station Compatibility Standard for Dual Mode Wideband Spread Spectrum Cellular System," incorporated herein by reference. The generation and receipt of CDMA signals is disclosed in U.S. Pat. No. 4,901,307 entitled "SPREAD SPECTRUM MULTIPLE ACCESS COMMUNICATION SYSTEMS USING SATELLITES OR TERRESTRIAL REPEATERS" and in U.S. Pat. No. 5,103,459 entitled "SYSTEM AND METHOD FOR GENERATING WAVEFORMS IN A CDMA CELLULAR TELEPHONE SYSTEM," both of which are assigned to the assignee of the present invention and incorporated herein by reference.

Radio Frequency (RF) signals are exchanged between a respective mobile unit and one or more base stations. Mobile units do not communicate directly with one another. Base stations communicate with a base station cellular or personal communication system controller, referred to herein as a base station controller (BSC) using various media such as ground based wires or a microwave link, for example. The BSC can route calls to a public switching telephone network (PSTN) or can route packets to a packet switched network, such as the Internet. The base station also coordinates the operation of base stations within the system during soft handoff for example.

TIA/EIA-95 is one example of a CDMA communication system. Communication from a mobile unit to one or more base stations in a TIA/EIA-95 CDMA system takes place over shared frequency channels each of which occupies approximately 1.25 MHz of radio frequency bandwidth. More specifically, communication signals occupying a given frequency band are discriminated at a receiving station through the spread spectrum CDMA waveform properties based on the use of a high rate pseudonoise (PN) code. A PN code is used to modulate signals transmitted from the base stations and mobile units. Signals from different base stations can be separately received at a given mobile unit either by the discrimination of different PN codes, and/or by the discrimination of shifted versions of the same PN code. The high rate PN spreading also allows a receiving station to receive a signal from a single transmission station where the signal has traveled over distinct propagation paths. Demodulation of multiple signals is disclosed in U.S. Pat. No. 5,490,165 entitled "DEMODULATION ELEMENT ASSIGNMENT IN A SYSTEM CAPABLE OF RECEIVING MULTIPLE SIGNALS" and in U.S. Pat. No. 5,109,390 entitled "DIVERSITY RECEIVER IN A CDMA CELLULAR TELEPHONE SYSTEM," both of which are assigned to the assignee of the present invention and incorporated herein by reference.

The various channels within a given "forward" (base station to mobile unit) TIA/EIA-95 CDMA channel include data channels, a synchronization channel, a pilot channel, and a set of paging channels, all transmitted from the base station to mobile units. The pilot channel carries a reference signal, commonly known as the pilot signal. The pilot signal is a regularly repeated digital pattern of "chips," wherein each chip is represented by a single binary digit. In the exemplary embodiment, the pilot signal is a pattern that is 32,768 "chips" in length, which repeats at a chip rate of 1.2288 MHz. Thus, the pattern repeats itself every 26.6 milliseconds (ms).

The pilot provides for time reference and for amplitude and phase tracking. The pilot signal allows mobile units to identify and become synchronized with the relative phase of a base station that is within range of the mobile units' communication capability. Synchronization with a base station allows the mobile unit to further refine its timing and receive data signals from the base station.

However, as the mobile unit moves, the base stations with which it is synchronized may become more distant or become blocked, and the signal from various stations may become too weak for continued reception. Further, as the mobile unit moves, a closer base station that was previously blocked may become unblocked. The more powerful signal from the closer base station may then suppress the reception of the weaker signal from the more distant, synchronized base station.

Accordingly, a mobile unit must periodically perform searches for pilot signals transmitted from other, alternative base stations in order to identify a base station with a stronger or higher power pilot signal with which to synchronize. In general, in order to facilitate these searches, the synchronized base station sends signals to the mobile unit that identify phase offsets of pilot channels for base stations neighboring the synchronized base station. Typically, to avoid pilot signal overlap, the pilot signals of neighboring base stations are phase shifted by at least 64 chips from each other. Thus, if a mobile unit is synchronized with a base station transmitting a pilot signal at a relative phase shift of 128 chips, the synchronized base station could have neighboring base stations broadcasting at relative phase shifts of 64 chips, 192 chips and, perhaps, 256 chips, for example. The mobile unit can then search for neighboring base station pilot signals around the specific phase offsets identified by the currently synchronized base station (e.g. 64, 172 and 256) on a periodic basis to determine whether to synchronize with another base station.

FIG. 1 is a block diagram of an earlier signal detection circuit or "searcher" 10 that can be used in a mobile unit to check the power of pilot signals at certain given phase offsets or to search for received pilot signals over an entire sequence of phase offsets. Searcher 10 includes a despreader 12, a correlator 14, an energy storage and sorting module 16, and a processing control 18.

The base station creates a pilot signal having two components: an in-phase, or "I" component; and a quadrature, or "Q" component. Using these two components, the base station modulates or "spreads" the pilot signal. Most often, the specific protocol used in spreading a CDMA signal is referred to as Quadrature Phase Shift Keying (QPSK) spreading. QPSK spreading is discussed in detail, for example, in R. Prasad, CDMA for Wireless Personal Communications, (Artech House, 1996). After receiving a signal and passing the signal through an analog to digital converter (not shown), despreader 12 performs a mathematical algorithm on the I- and Q-components of a signal to ensure that the correct signal magnitude is detected. The mathematical algorithm used for PN despreading involves the exclusive-oring (XORing) of expected I- and Q-components with the I and Q components received. The specifics of the mathematical algorithm, as well as the specific components used in a typical despreader are well known in the art.

Correlator 14 compares an input despread signal from despreader 12 and compares it with a reference signal, commonly termed an expected signal. The expected signal can include a portion of the 32,768 chip pattern of the PN pilot signal provided to the correlator at a certain phase offset. Correlator 14 produces an energy output indicative of the level of correlation between the input despread signal and the reference signal. For example, while an exact match of all compared chips will yield a high energy output, and a match of 50% or less of all compared chips will yield a low energy output, various energy outputs between the high and low range will be yielded in accordance with a match that falls between these levels.

FIG. 2 is a schematic diagram of a greatly simplified correlator 14. A detected signal is input into a comparator 112 at input 114 and an expected signal is input into comparator 112 at input 116. For purposes of the present application, it is convenient to discuss the signal transmitted by a base station as a digital signal composed of 1's and −1's. The comparator 112 can perform, for example, a multiplying function such that if the digital components of the signals at inputs 114 and 116 match (e.g. 1,1 or −1,−1), the output 118 is 1, or high, and if the digital components of the signals at inputs 114 and 116 do not match (e.g. −1,1 or 1,−1) the output 118 of comparator 112 is −1, or low.

Output 118 is then fed into integrator 120 which sums the outputs of comparator 112 over the total period of the portion of the PN signal used as the expected signal. For example, if the expected signal is 1024 chips in length, then the integration time will be (1024)(0.81 microseconds)=829 microseconds, because a chip arrives every 0.81 microseconds in the preferred embodiment. In this way, the output 14 of the correlator will have a relatively large magnitude when the detected signal matches the expected signal.

Additionally, even when there is a match of the pilot signal with the expected signal, the magnitude of the correlator output will be larger for a stronger signal. This is because as a signal becomes weaker, that is, if it is transmitted over a relatively long distance or reflected off various objects, it degrades. This degradation results in changes of the individual chip values of the pattern of the transmitted pilot signal. Thus, for a weaker signal, even though the pilot signal is being transmitted at a phase offset that is being searched for, it is likely that fewer chip values will result in matches, and the integrator of the correlator will therefore not sum as many positive values as would be summed were the signal stronger. Thus, the output of the integrator is a relative representation of the strength or energy of a given phase pilot signal that was searched for. The larger the magnitude of the correlator output 14, the stronger or higher energy of the detected pilot signal.

The output of the correlator 14 is fed into energy storage and sorting module 16. Energy storage and sorting module 16 can perform a number of functions. It can place in memory output energies from correlator 14 that are above a certain threshold. It can also place in memory the corresponding phase offset of the pilot signal that generated the stored energies. Alternatively, it can place in predetermined memory locations corresponding to given pilot phase offsets (such as offsets corresponding to neighbors of the synchronized base stations) the energy output of the correlator 14 at that phase offset. Specific components used for, and the operation of, typical energy storage and sorting modules are well known in the art and generally include RAM for storing energy levels and phase offsets, and logic for sorting the different energy levels.

Processing control 18 provides general control for the mobile unit and makes determinations concerning with which pilot signal, and therefore which base station, the mobile unit should synchronize. It can access the energy information in energy storage and sorting module 16 for data on which to base such determinations. Processing controls such as processing control 18 typically include a microprocessor, memory, and busses, the configuration of which is well known in the art.

Because processing control 18 provides general control for the mobile unit, it may only be able to allocate a small amount of time to checking the energy storage and sorting module 16 to determine if the mobile unit should be re-synchronized with another base-station. Additionally, the sequential collection of information concerning magnitudes of pilot signals having phase offsets other than that of the currently synchronized pilot signal can be time consuming. Thus, from time to time, the mobile unit may remain synchronized with a pilot signal of a given base station even though it could synchronize with the pilot signal of another closer, or otherwise more suitable, base station instead. This can undesirably lead to the signal jamming or weak signal difficulties described above.

Additionally, due to reflections off of buildings, hills or other obstacles and/or atmospheric conditions, the neighboring base stations may not appear to be phase shifted by exactly 64 chips from the synchronized base station. And, depending on the location of the synchronized base station, there may be other base stations in the area for which phase offsets were not provided by the synchronized base station. Thus, it may be desirable to search the full sequence of 32,768 phase offsets for pilot channels, not just pilot channels that are phase shifted by predetermined multiples of 64 chips from the currently synchronized base station. The searching, sorting, storing and processor control checking associated with such full sequence searches can consume considerable processing control resources.

Methods and apparatus are also known for determining when to handoff a signal from one base station to another as a mobile unit moves. One such method using a matched filter is disclosed, for example, in U.S. Pat. No. 5,864,578, to Yuen, et al., for a "MATCHED FILTER BASED HAND-OFF METHOD AND APPARATUS." However, the matched filter disclosed by Yuen must be programmable. Such a programmable matched filter can be relatively expensive to manufacture and can require a relatively large amount of power to operate and require extra circuitry. This can be disadvantageous as mobile cellular units typically operate with a limited power supply battery and have limited space for circuitry.

Accordingly, cellular pilot searching improvements are desired. In particular, such searching should be able to be performed relatively quickly while still encompassing a broad portion of the full PN pilot sequence. A searcher should also allow for relatively high frequency checks of high priority pilot phase offsets, such as those of base stations that neighbor the synchronized base station. Additionally, such searching should require a relatively small amount of processing control time to monitor. Also, the searcher should be relatively low cost to manufacture, consume relatively low power, and be relatively compact.

SUMMARY

The present invention includes a signal detection circuit or "searcher" in a mobile unit of a digital cellular communications system. The signal detection circuit includes a matched filter for comparing a received digital input pattern with a predetermined expected digital pattern. The matched filter includes a plurality of taps, each tap for detecting a single digital signal component. The matched filter also includes at least one summer connected to the taps. The summer generates a relatively large signal when the digital signal components detected by the plurality of taps match the predetermined digital pattern.

The signal detection circuit can also include a correlator that is connected in parallel with the matched filter. The correlator is also for comparing the received digital input pattern with the predetermined digital pattern. Preferably, both the matched filter and the correlator are separate from a central processing control of the mobile unit.

The matched filter is advantageously able to search through an entire sequence of pilot signal phase offsets in a relatively short period of time. By including the correlator as part of the detection circuit, a parallel search for a small number of specific pilot signal phase offsets can advantageously be performed in an even shorter period of time. Additionally, if the matched filter and correlator are separate from a central processing control of the receiver, a minimum of processor resources are necessary to monitor search results from the matched filter and correlator.

Another aspect of the present invention includes a method for detecting a digital cellular communications signal. According to the method, the digital signal is input into a matched filter. The matched filter compares a digital pattern of the input digital signal to a predetermined digital pattern. The matched filter then generates a relatively high output signal if the digital pattern of the input digital signal matches the predetermined digital pattern.

BRIEF DESCRIPTION OF THE DRAWINGS

Prior art

Prior art

DETAILED DESCRIPTION

The present invention includes a method and apparatus for rapidly detecting the strength or power of different phase pilot signals being received by a mobile cellular unit. Because, as discussed above, each base station transmits a pilot signal at a different phase offset, by rapidly detecting the strength of the received pilot signals having different phases, the mobile cellular unit can efficiently determine the most appropriate base station with which to synchronize.

Figure 3:
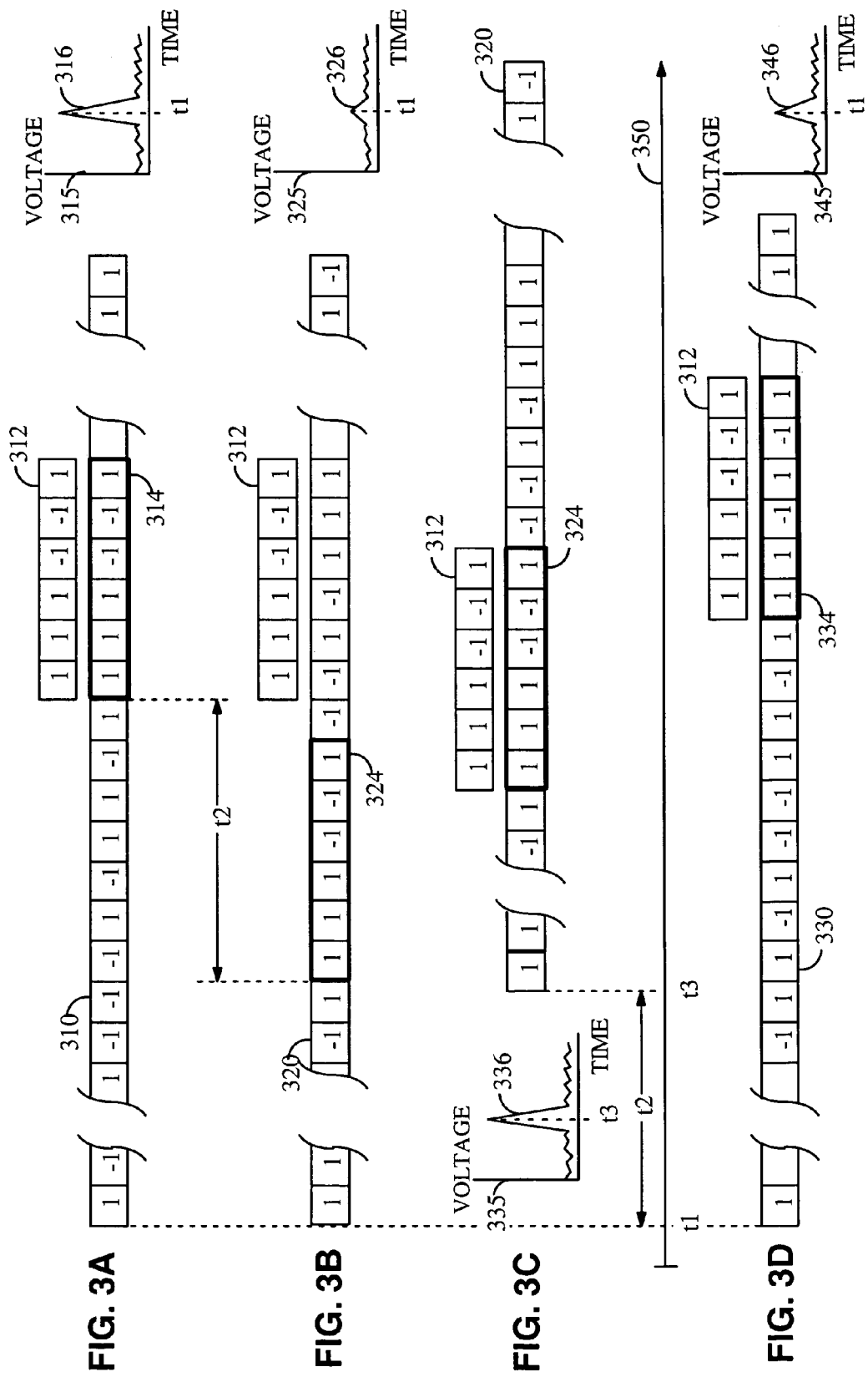
FIG 3A is a diagram illustrating a first phase pilot signal and matching detection device detecting of a portion of the first phase pilot signal, and the output of such a matching detection device, in accordance with the present invention.
FIG. 3B is a diagram illustrating a second phase pilot signal the matching detection device shown in FIG. 3a prior to detecting a portion of the second phase pilot signal, and the commensurate output of the matching detection device, in accordance with the present invention.
FIG. 3C is a diagram illustrating the second phase pilot signal shown in FIG. 3B and the matching detection device shown in FIG. 3A detecting a portion of the second phase pilot signal, and the commensurate output of the matching detection device, in accordance with the present invention.
FIG. 3D is a diagram of a relatively lower power pilot signal and the matching detector shown in FIG. 3A detecting the relatively low power pilot signal, and the commensurate output of the matching detection device, in accordance with the present invention.

FIGS. 3A, 3B, 3C and 3D are diagrams illustrating detection of pilot signals in accordance with the present invention. In FIG. 3A, a pilot signal 310 has a specific digital signal pattern of chip values, represented by 1s and –1s. As discussed in the Background section, every pilot signal transmitted by every base station has the same digital signal pattern. However, as indicated above, each pilot signal may be a shifted version of one another. The pilot signal 310 is received in a serial manner by a mobile unit (not shown). The mobile unit includes a matching detector 312 that is configured with at least a portion of the digital signal pattern of the pilot signal. Specifically, for purposes of illustration, in FIGS. 3A–3D, matching detector 312 is configured with the six chip sequence (1,1,1,–1,–1,1). As discussed below, an actual matching detector is preferably configured with a significantly longer chip sequence. The matching detector can be either programmed into software or, as discussed below, can be a hardware circuit.

When the mobile unit receives a pilot signal 310, it actually receives a mixture of the transmitted signal and noise. For the purposes of simplicity, the received mixture of pilot signal 310 and noise is hereinafter referred to as pilot signal 310. As pilot signal 310 is serially received by the mobile unit, a portion of digital signal pattern of the pilot signal 310 is compared to the digital signal pattern configured in the matching detector 312. Because the matching detector 312 is configured with at least a portion of the specific digital pilot signal pattern, at some point during the serial receipt of the pilot signal 310, the portion of the pattern of the pilot signal 310 that is being compared will likely match the pattern configured in the matching detector 312. This situation is shown in FIG 3A. Specifically, the portion 314 of the pilot signal 310 matches the portion of the pilot signal pattern configured in matching detector 312. When the match occurs, the matching detector can generate a match signal.

Although FIG. 3A shows a complete match between matching detector 312 and portion 314 of pilot signal 310, due primarily to noise in a received pilot signal, a complete match of all the chips of the portion of the pilot signal pattern that is configured in the matched detector may not occur. Thus, preferably, the matching detector can be configured to generate a different magnitude signal depending upon the number of chips that match. Preferably, though not necessarily, the greater the number of chips that match, the greater the magnitude of the signal generated by the matching detector 312. Thus, as shown in FIG. 3A, the signal 316 generated by the matching detector 312 can, for example, be a voltage, and the more chips that match, the higher the voltage signal generated. Accordingly, on a relatively complete match, the matching detector 312 would generate a relatively high voltage spike 316, as shown on grid 315 in FIG. 3A, at the point in time during which the relatively complete match occurs. Indicating time on horizontal axis 350, the relative time is indicated as t1. The magnitude of the voltage spike, indicating a match, and the relative time at which the spike occurred, t1, can then be stored in a local memory.

As discussed in the background section, the digital chip pattern is the same for a pilot signal transmitted by any base station. However, the phase of the pilot signals transmitted by different base stations is shifted. FIG. 3B shows a second pilot signal 320 having the same digital pattern of +1s and −1s as first pilot signal 310, but shifted in phase by time t2. This can be seen by the fact that the portion 324 of pilot signal 320 that matches the chips configured in matching detector 312 is shifted from the identical portion 314, in pilot signal 310, by time t2. Thus, no match will occur between matching detector 312 and second pilot signal 320 at relative time t1. Therefore, the signal 326 output by matching detector 312, shown on time vs. voltage grid 325, will have a relatively small magnitude at relative time t1.

However, as shown in FIG. 3C, at relative time t3, which is offset from time t1 by the phase shift time of t2, matching detector 312 will indicate a match of the pilot signal 320. Thus, as shown on time vs. voltage grid 335, the signal 336 output by matching detector 312 will be relatively large at time t3. As with pilot signal 310, the magnitude of signal 336, indicating a match, and the relative time at which the match occurred, t3, can be stored in a local memory.

As discussed in the background section, when the mobile unit synchronizes with a base station, it receives an absolute time base from that base station in the form of a chip offset assigned to the base station. Thus, the mobile unit can use this absolute chip offset to assign absolute chip offsets to the relative times, such as t1 and t3, at which relatively large magnitude signals have been detected. For example, the mobile unit can determine that relative time t1 occurred at a chip offset of 64, and the relative time t3 occurred at a chip offset of 128, 64 chips after t1.

Additionally, because the magnitude of the signal generated by matching detector 312 is proportional to the number of chips that match, the relative magnitude of the matching detector signal indicates the relative strength of the detected signal. This is because the weaker or lower power the pilot signal, the more noise will be received with it. And, the more noise, the greater the errors in the chip pattern received by the mobile unit. Thus, on average, for a relatively weaker pilot signal, relatively fewer chips will match in the portion of the pilot signal configured in the matching detector.

This situation is shown in FIG. 3D, which shows a third pilot signal 330 that is weaker than first pilot signal 310. Box 334 shows the portior in of the digital chip pattern of pilot signal 330 that is configured in matching detector 312. This portion of pilot signal 330 should match with the chips configured in matching detector 312 at time t1. However, as shown, because of errors due to noise, fewer than all of the chips configured in the matching detector 312 are matched in the portion 334 of pilot signal 330. Specifically, the third and fourth chips in portion 314 have been inverted, by noise arriving with the signal, from a 1 to a −1 and from a −1 to a 1, respectively. Thus, as shown in time vs. voltage grid 345, the magnitude of the signal 346 generated by matching detector 312 is relatively lower than the magnitude of the signal 316 generated by more powerful pilot signal 310. This indicates that while the mobile unit is receiving a pilot signal 330, it is weaker than pilot signal 310, and, therefore, probably less appropriate for synchronization.

By collecting pilot signal phase and magnitude information as discussed above, a mobile unit can determine whether a base station other than the one with that it is currently synchronized is more appropriate for synchronization. For example, a mobile unit may currently be synchronized on a base station transmitting a pilot signal at a chip offset of 64. And, matching detector 312 detects a pilot signal at a chip offset of 128 that has a larger magnitude (that is, generates a higher magnitude output signal on a match) than the pilot signal detected at chip offset 64. Thus, the mobile unit may operate more effectively, that is, generate a clearer transmission and/or be less likely to drop a received transmission, if it re-synchronizes with the base station transmitting the pilot signal of chip offset of 128.

The above described method and apparatus can advantageously check the entire sequence of pilot signal phase offsets for relatively strong pilot signals in a relatively short period of time. Specifically, as noted in the Background section, each pilot signal chip pattern extends for 32,768 chips before repeating itself. Thus, there are 32,768 possible phases of pilot signals. For each possible phase of pilot signal, the portion of the pilot signal pattern that is configured in the matching detector will necessarily occur once in the time it takes an entire pilot signal serially pass through the matching detector 312. Accordingly, to check for a match at each of the possible 32,768 phases of pilot signals, a received signal must be serially passed through the matching detector for the amount of time it takes to pass an entire pilot signal through the matching detector. And, because pilot signals are transmitted at a frequency of 1.2288 MHz, this takes 26.6 ms. Therefore, using the method and apparatus of the present invention, the entire sequence of pilot signal phase offsets can be advantageously checked in 26.6 ms using a single matched filter. In alternate embodiments, two or more matched filters operate in parallel, in which each matched filter searches a different phase offset. In this manner, the entire sequence of phase offsets could be checked in a fractional portion of 26.6 ms (for example, 13.3 ms when two matched filters are present, 8.87 ms when three matched filters are present, etc.).

Figure 1:
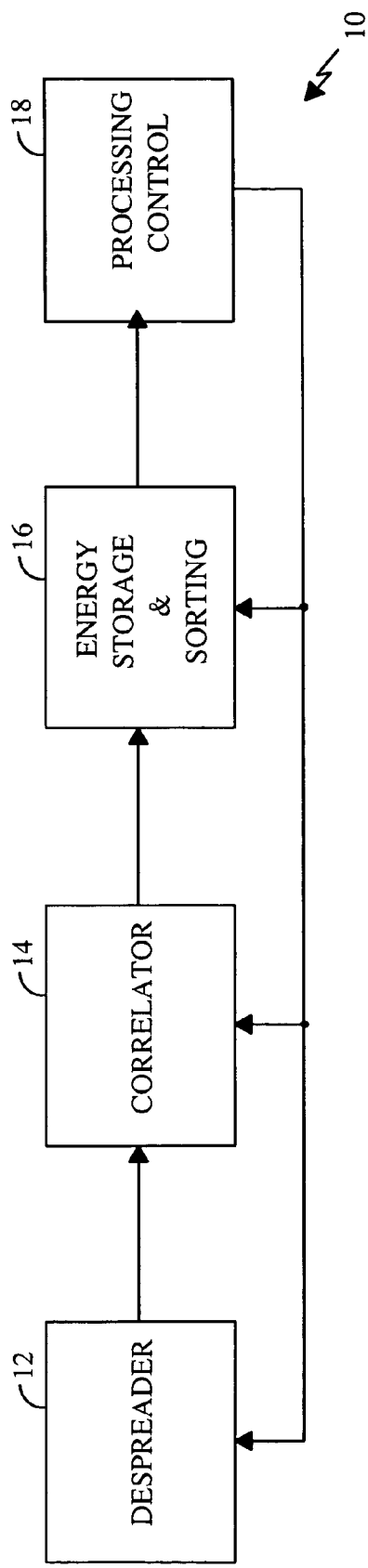
FIG. 1 is a block diagram of an earlier pilot signal searcher for use in a digital cellular mobile unit.
Figure 2:
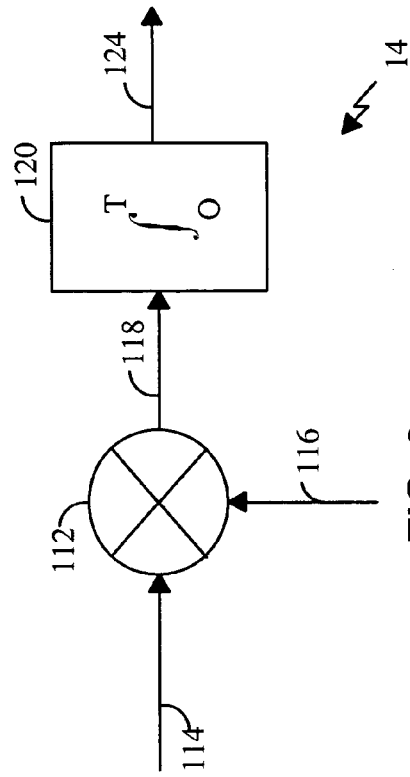
FIG. 2 is a block diagram of a greatly simplified correlator for use with the pilot signal searcher shown in FIG. 1.

It is also within the ambit of the present invention to use a matching detector as described above in parallel with the type of correlator shown in FIG. 2 and described in the Background section. As discussed in the Background section, the correlator can search at a first phase offset and then, if no significant energy is being detected, switch to searching at any other phase offset, which may be hundreds or thousands of chips from the first phase offset, simply by changing the phase of the reference signal. Additionally, while the maximum energy information in a correlator would be obtained by a full 26.6 ms search, if no significant or unexpected energy is being detected at a given phase offset after only a portion of 26.6 ms, the search could be abandoned and a new search could be initiated at another phase offset.

Thus, by using a correlator in parallel with a matching detector such as matching detector 312, the correlator can check phase offsets of base stations around the phase offset of the pilot signal with which the mobile unit is currently synchronized. Simultaneously, the matching detector can advantageously sweep through the entire sequence of phase offsets to check for any other strong pilot signals that the correlator might miss because it is checking only a small subset of the total sequence of pilot signal phase offsets. This advantageously provides the mobile unit with information concerning pilot signal strength over the entire sequence of pilot signal phase offsets in a relatively short period of time (~26.6 ms) while still allowing monitoring of high priority phase offsets (e.g., the phase offsets of base stations neighboring the currently synchronized base station) at an even higher rate (e.g. two, three or more neighboring phase offsets could be checked in ~26.6 ms).

As described above, a correlator provides an efficient means of searching for pilots at particular offsets. Additionally, correlators, which typically sum large numbers of chips, can often provide more reliable estimates than a matched filter as to whether a pilot signal has actually been detected. Although a matched filter may not provide as reliable an estimate as a comparable costing correlator, as described above, a matched filter provides a very quick and efficient means of detecting relatively strong pilot signals at unknown offsets. Thus, a matched filter can prove useful in various situations, such as locating a first pilot signal as soon as a phone is powered on. As well, when a neighbor list transmitted by a base station fails to advertise a pilot that is receivable by a mobile station, a matched filter would allow the mobile station to quickly find the pilot nonetheless. Solely using correlators to find such a pilot could prove to take a much longer time, since the neighbor list would not have indicated to the correlators the offset to search for this pilot at.

Specific embodiments of the present invention are described below. It is to be understood that the present invention is not limited to the specific embodiments described above. Many widely different embodiments of the present invention may be constructed without departing from the spirit and scope of the present invention.

Figure 4:
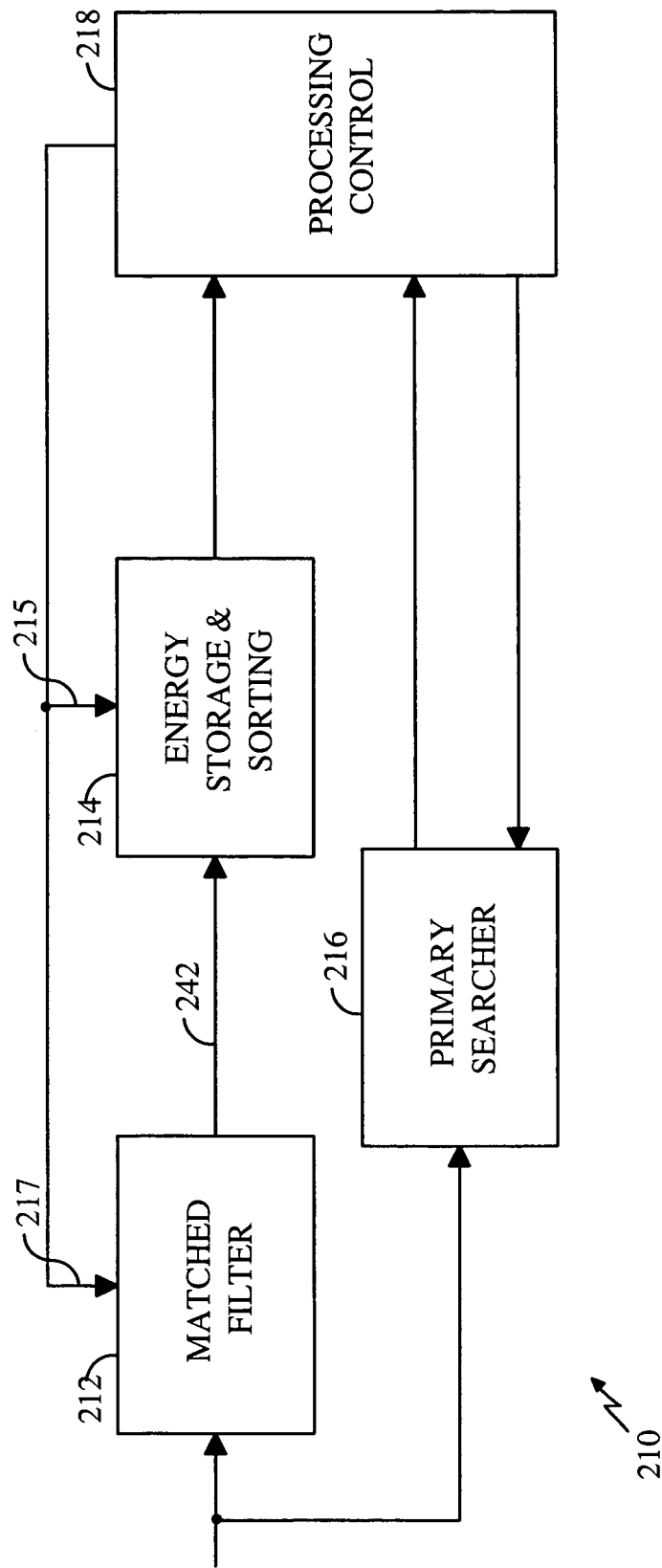
FIG. 4 is a block diagram of a pilot signal searcher including a despreading matched filter in accordance with the present invention.

FIG. 4 is a block diagram showing an embodiment of a matched filter assisted signal detection circuit or searcher 210 in accordance with the present invention. Searcher 210 includes a despreading matched filter 212, the output of which is fed into energy storage and sorting module 214. Energy storage and sorting module 214 is connected to a processing control 218. Searcher 210 also includes a primary searcher 216 in parallel to the despreading matched filter 212. Primary searcher 216 can be similar to the prior art searcher 10 discussed above. Primary searcher 216 is also connected to processing control 218.

Figure 5:
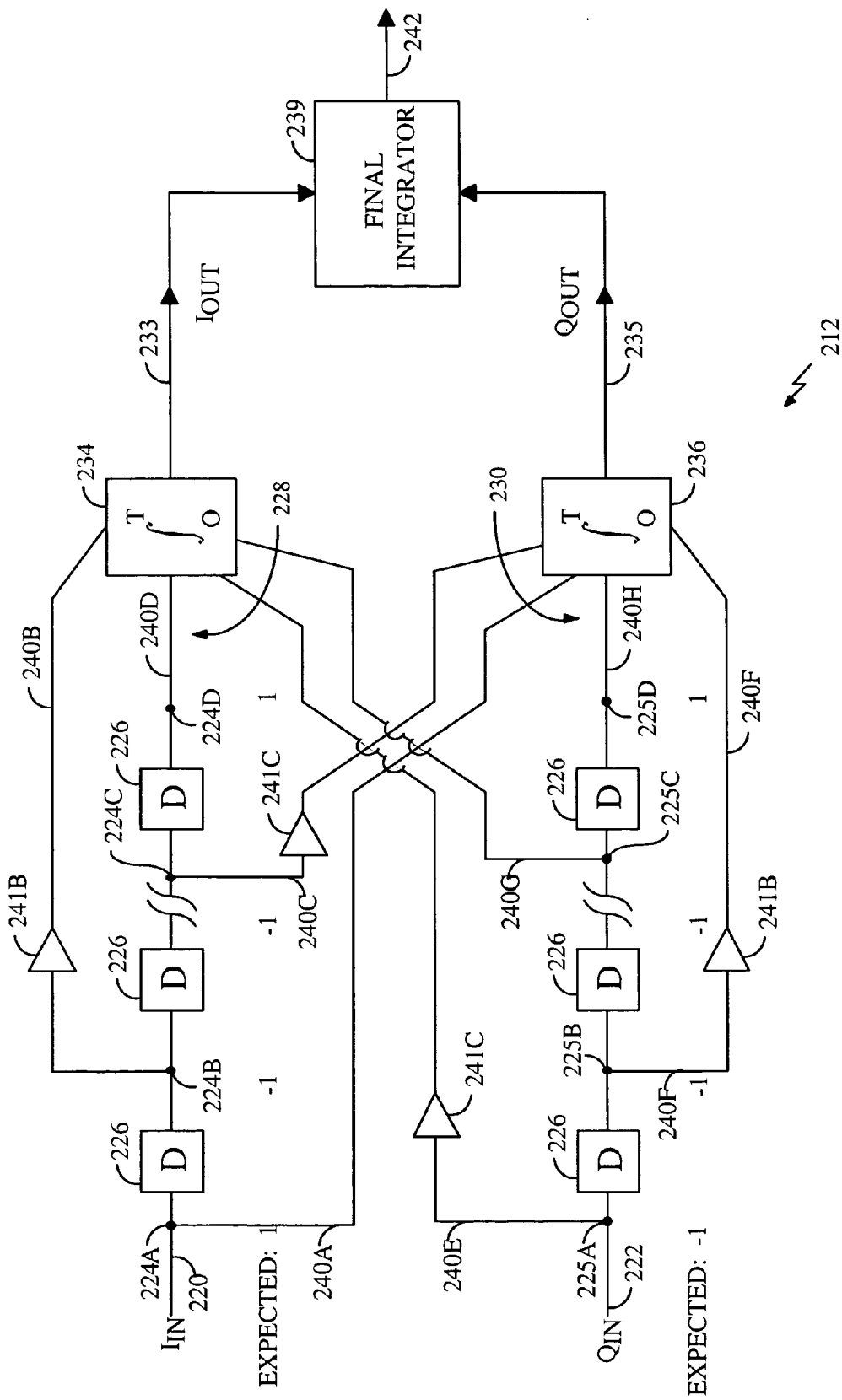
FIG. 5 is a schematic diagram of a despreading matched filter in accordance with the present invention and which can be used in conjunction with the pilot signal searcher shown in FIG. 3.

Despreading matched filter 212 is for despreading and detecting pilot signals received by a mobile unit in which searcher 210 is deployed. FIG. 5 is a schematic diagram showing one embodiment of despreading matched filter 212. As discussed in the Background section, a PN pilot signal includes both an in-phase (I) and quadrature (Q) component. To accommodate these two signal components, matched filter 212 includes an I-input 220 and a Q-input 221. Matched filter 212 also includes a plurality of I-taps 224A, 224B, 224C, and 224D for holding and reading values of a single pilot signal pattern component (e.g., a single bit or chip). I-Taps 224A–224D are distributed sequentially along an I-primary line 228. A Q-primary line 230 includes a plurality of Q-taps 225A, 225B, 225C and 225D distributed sequentially there-along. Between each adjacent pair of taps 224A–224D and 225A–225D, is a delay circuit 226 for holding a chip value on each tap for a predetermined amount of time. Delay circuits 226 can be any devices that will delay transmission of a signal from the input to the output for a predetermined period of time and are preferably simple latches.

Preferably, at the end of the I-primary line 228, adjacent to an I-output 233, is an I-integrator 234 and at the end of the Q-primary line 230, adjacent to a Q-output 235, is a Q-integrator 236. The I-integrator 234 and Q-integrator 236 are for summing chip values held on the taps 224A–224D and 225A–225D. A plurality of tap lines 240a–240h connect the I-taps 224A–224D and Q-taps 224A–225D to the I-integrator 234 and Q-integrator 236. The I-output 233 and Q-output 235 are then fed into a final integrator 239. Final integrator 239, in the exemplary embodiment, sums the squares of I-output 233 and Q-output 235, and produces a matched filter voltage output, matched filter output 242, accordingly. Matched filter output 242 feeds into energy storage and sorting module 214. Matched filter 212 detects a pilot signal that matches a predetermined digital pattern by outputting a relatively large energy signal when a match is detected. Additionally, it despreads the pilot signal that was initially spread by the base station, as discussed in the background section. This despreading is implemented to compensate for any relative shift in phase that may have occurred to the pilot signal in transmission of the signal from the base station. Preferably, matched filter 212 implements a QPSK despreading scheme. However, it is within the scope of the present invention for matched filter 212 to implement any type of despreading scheme.

To perform these functions, the I-component of a received digital pilot signal is fed into the I-input 220 and the Q-component of the received pilot signal is fed into the Q-input 221. The rate at which the Q- and I-components of the pilot signal are fed into the inputs 220 and 221, respectively, that is, the "sampling" rate of matched filter 212, allows one chip of the pilot signal to be placed on the taps 224A and 225A, respectively, per sample. This sampling rate is preferably simply the frequency of the pilot signal, which in the present embodiment is 1.2288 MHz. The first delay circuits 226 in the I-primary line 228 and Q-primary line 230 then delay the pilot signal, preferably holding the chip values on the first taps 224A and 225A for approximately 0.81 microseconds, the period of a pilot chip. The delays 226 then pass the chip values on taps 224A and 225A to taps 224B and 225B, respectively.

Because in a presently preferred embodiment, 0.81 microseconds is the period of a pilot chip, this delay time allows a second chip value of the pilot signal to be placed on the taps 224A and 225A simultaneously with the transfer from taps 224A and 225A to taps 224B and 225B, respectively, of the first chip value. This process continues until each tap 224A–224D and 225A–225D in matched filter 212 has a chip value.

Each time a sample is taken, that is, preferably approximately every 0.81 microseconds, the chip values at the nth tap are routed to the I- and Q-integrators 234 and 236, respectively, via tap lines 240A–240H, according to chart 1 below.

CHART 1

| I-expected$_n$ | Q-expected$_n$ | I-out$_n$ | Q-out$_n$ |
|---|---|---|---|
| 1 | 1 | I$_n$ | Q$_n$ |
| 1 | −1 | −Q$_n$ | I$_n$ |
| −1 | 1 | Q$_n$ | −I$_n$ |
| −1 | −1 | −I$_n$ | −Q$_n$ |

By routing the I-and Q-component chip values to the I- and Q-integrators as in Chart 1, the matched filter 212 both despreads the input QPSK pilot signal and provides a maximum output when a predetermined signal is matched. The predetermined sequence of chip values for which the matched filter searches is configured into the matched filter by the interconnection or mapping of tap lines 240A–240H with I- and Q-integrators 234 and 236, respectively, an example of which is shown in FIG. 5. In the manner explained below, Chart 1 can be used as a "key" to determine how to interconnect tap lines 250A–240H with I- and Q-integrators 234 and 236 respectively to QPSK despread the input pilot signal and provide a maximum output when a predetermined signal is matched.

To detect the predetermined pilot sequence having an I-chip sequence of, for example, 1,−1,−1,1 and Q-chip sequence of, for example, −1,−1,1,1, according to a QPSK despreading scheme, the tap line interconnection or mapping shown in FIG. 5 would be implemented. This mapping is completed according to Chart 1. The first and second columns of chart 1, labeled (I-expected$_n$, Q-expected$_n$), respectively, show each of the four I- and Q-chip value combinations that could possibly make up a single set of simultaneous I- and Q-chip values of a predetermined pilot sequence, that is, the four possible values for the pair (I-expected$_n$, Q-expected$_n$). Specifically, (1,1) in the first row, (1, −1) in the second row, (−1, 1) in the third row, and (−1, −1) in the fourth row. The third and fourth columns of chart 1 show how the actual value on an I-tap (In) and Q-tap (Qn) are routed to the I-integrator 234 (I-outn) or Q-integrator 236 (Q-outn) in order to both QPSK despread the pilot signal and to provide a maximum output of matched filter 212 when the predetermined pilot signal is received.

For example, the first row of Chart 1 shows how to connect an I-tap and Q-tap to the I-integrator 234 and Q-integrator 236 if the expected chip value on the I-tap will be 1 simultaneous with an expected chip value of 1 on the Q-tap, that is, for an (I-expected$_n$, Q-expected$_n$) combination of (1,1). The "In" in the I-outn column (the third column) of the first row indicates that, for an (I-expected$_n$, Q-expected$_n$)=(1,1), the actual value on the I-tap is directly routed to, that is, directly wired to, the I-integrator 234. The "Qn" in the Q-outn column (the fourth column) of Chart 1 indicates that for an (I-expected$_n$, Q-expected$_n$)=(1,1) the actual value on the Q-tap is directly routed to, that, directly wired to, the Q-integrator 234.

For a predetermined pilot sequence having an I-chip sequence of, 1,−1,−1,1 and Q-chip sequence of, −1,−1,1,1, the I-tap and Q-tap that would be interconnected to integrators 234 and 236 to produce a maximum output for an (I-expected$_n$, Q-expected$_n$)=(1,1) would be taps 224*d* and 225*d*. This is because in the expected pilot sequence, the (I-expected$_n$, Q-expected$_n$) of (1,1) is the fourth combination to occur in the predetermined pilot sequence, and I-tap 224D and Q-tap 225D are the pair of taps that are fourth along the I-primary line 228 and Q-primary line 230, respectively, from the I-input 220 and Q-input 221, respectively.

Thus, as shown in FIG. 5, the I-tap value, 1, is directly routed to the I-integrator 234 via tap line 240*d* and the Q-tap value, 1, is directly routed to the Q-integrator 236 via tap line 240*h*. This provides the maximum values, 1 and 1, to I- and Q-integrators 234 and 236, respectively, to generate a maximal output value.

The second row of Chart 1 shows how an I-tap and Q-tap would be interconnected to integrators 234 and 236 for an (I-expected$_n$, Q-expected$_n$)=(1,−1). To generate a maximum matched filter output signal, and QPSK despread the input pilot signal, for (I-expected$_n$, Q-expected$_n$)=(1,−1) the "−Qn" in the I-outn column of the second row indicates that the actual value on the Q tap be inverted and routed to the I-integrator 234. The "In" in the Q-outn column of the second row indicates that the actual value on the I-tap be directly routed to the Q-integrator 236. For the example, predetermined pilot sequence having an I-chip sequence of, 1,−1,−1,1 and Q-chip sequence of, −1,−1,1,1, the (I-expected$_n$, Q-expected$_n$) of (1,−1) occurs as the first combination. Thus, I-tap and Q-tap that would be interconnected to integrators 234 and 236 to produce and maximum output for an (I-expected$_n$, Q-expected$_n$)=(1,−1) would be I-tap 224D and Q-tap 225D, the first pair of taps in the primary lines 228 and 230 after inputs 220 and 222.

Thus, as shown in FIG. 5, the I-tap value, 1, on I-tap 224A is routed to the Q-integrator 236 via tap line 240A and the Q-tap value, −1, on Q-tap 225A is routed via tap line 240E through an inverter 241E, to the I-integrator 236. Thus, when the input chip value matches the expected chip value, a 1 is routed to both integrators 234 and 236 to maximize the sum for taps 224A and 225A.

The third and fourth rows of Chart 1 are implemented in the manner described above with respect to the first and second rows of Chart 1. In the third row, for (I-expectedn, Q-expectedn)=(−1,1), as is the case on taps 224C and 225C, the I-tap value, −1, is routed via tap line 240C through inverter 241C, to the Q-integrator 236 and the Q-tap value, 1, is routed via tap line 240G directly to the I-integrator 234. Because the I value, −1, is inverted, and the Q value, 1, is routed directly, the integrators 234 and 236 add maximally to the sum for taps 224C and 225C when there is a match on taps 224C and 225C to the expected values of (−1,1). Finally, if (I-expectedn, Q-expectedn)=(−1,−1), as it would on taps, 224B and 225B the I-tap value, −1, is routed through inverter 241B to the I-integrator 234 via tap line 240B and the Q-tap value, −1, is routed through inverter 241B to the Q-integrator 236 via tap line 240F. Again, this mapping generates a maximal sum in integrators 234 and 236 for taps 224D and 225D when there is a match on these taps to the expected value of(1,1).

Each integrator 234 and 236 sums the inputs from the tap lines 240A–240H. The I-output 233 and Q-output 235 are then fed into a final integrator 239. Final integrator 239 preferably squares value of the I-output 233 and Q-output 235 signals and preferably sums the result. In this way, the final integrator 239 effectively generates an energy measurement from the voltage signals. This energy measurement can be a multiple bit digital signal and will be relatively large for times at which the digital signal on the taps of the matched filter match the matched filter's predetermined sequence.

Only eight taps 224D and 225A–225D are shown in matched filter 212. For a digital signal length of 32,768 chips, up to 32,768 taps in each primary line of the matched filter could be used. However, to manufacture a matched filter with such a large number of taps would be extremely difficult and relatively expensive, and it is unnecessary. In order to detect the presence of the pilot signal pattern, only a portion of the chip pattern need be used. However, to minimize the likelihood of a false match, matched filter 212 preferably has at least 16 taps in each primary line 228, 230. More preferably, matched filter 212 includes approximately 1024 taps; 512 in I-primary line 228 and 512 in Q-primary line 230.

By sampling at a rate of 1.2288 MHz and shifting the samples through and holding them on successive taps, matched filter 212 can build up a history of received signal samples. Further, as discussed in the background section, the pilot signals transmitted by different base stations are identical to each other but shifted or offset in phase. Thus, because the sampling rate of matched filter 212 is the same as the frequency of the broadcast pilot signals, and assuming there are 512 taps in each primary line 228, 230 of matched filter 212, upon the acquisition of each single chip sample, the matched filter 212 effectively checks for a match of a full 512 chips of a pilot signal at a given phase offset. Matched filter 212 detects a match when a large preponderance of the taps (ideally all) route +1's to each integrator 234 and 236, rather than −1's.

As discussed above, in matched filter 212, 1 values are routed from the taps to the integrators 234 and 236 only when the actual value on a tap matches an expected value. Otherwise, a −1 is routed to the integrators 234 and 236, which reduces the magnitude of the output of the integrators 234 and 236 and reduces the magnitude of the output of matched filter 212 from final integrator 239. Thus, the greater the number of received chip values that match the expected chip values on the taps of matched filter 212, the greater the magnitude of the output of matched filter 212. As explained above with respect to FIGS. 3A–3D, the stronger the pilot signal, the greater the number of received chip values of that pilot signal which will match the predetermined pilot sequence. Thus, the magnitude of the output of matched Therefore, a relatively high voltage magnitude generated at output 235 of matched filter 212 would indicate the presence of a relatively strong pilot signal at a given phase offset. Matched filter 212 transmits the output energy level to energy storage and sorting module 214 via output 242.

Energy storage and sorting module 214 can include memory capability (such as RAM) and logic to provide for sorting of signals having different energy levels. If a relatively large magnitude signal is detected at matched filter primary output 242 the magnitude and phase offset of the signal can be stored by energy storage and sorting module 214. There are a variety of ways in which energy storage and sorting module 214 can be configured to store detection information from matched filter 212. For example, energy storage and sorting module 214 can be configured to store information only about signals that are of a magnitude larger than a predetermined value. Alternatively, energy storage and sorting module 214 can store information about signals of a given magnitude at memory locations associated with the given magnitude. Implementation and configuration of memory and logic components to perform these functions is well known in the art.

As shown in FIG. 4, the output of energy storage and sorting module 214 is fed into processing control 218. Processing control 218 can include a standard microprocessor, memory elements, and data and address busses. Processing control 218 generally controls the operation of the mobile unit. Additionally, processing control can monitor or control the operation of matched filter 212 and energy storage and sorting module 214 via bus lines 217 and 215, respectively. For example, it could set threshold energy values which energy storage and sorting module 214 is to store or clear stored values out of energy storage and sorting module 214. Implementation and configuration of a microprocessor and other components to perform these functions are described below.

As discussed in the background section, once the mobile unit locates and acquires a relatively strong pilot signal, the pilot signal synchronizes the time base of the mobile unit with the base station that sent the pilot signal. In this way, the mobile unit is provided with the absolute phase offset of the relatively strong pilot signal it is receiving. By comparing when primary searcher 216 detects the pilot of the currently synchronized base station to the times at which matched filter 212 detects each relatively strong pilot signal, processing control 218 can determine the absolute phase offsets of each pilot signal detected by matched filter 212.

The information concerning phase offset and energy of detected pilot signals can be used by processing control 218 in a variety of ways. Processing control 218 could, for instance, alert primary searcher 216 to begin searching at one or more of the absolute phase offsets mentioned above. Additionally, as noted in the Background section, processing control 218 makes decisions concerning with which base station the mobile unit should synchronize. Also, as noted in the Background section, processing control 218 may have synchronized on a base station that is not the closest base station to the mobile unit. Thus, the energy storage and sorting module 214 could alert processing control 218 when a signal having a magnitude above a certain threshold is detected. This would allow processing control 218 to determine whether it should synchronize with a base station other than the one with which it is currently synchronized. This would occur when it is determined from the output of energy storage and sorting module 214 that a pilot signal detected by matched filter 212 having an energy level above a certain threshold constitutes the earliest arriving pilot. Alternatively, rather than energy storage and sorting module 214 provide measurements to processing control 218 whenever energies above a certain threshold are determined, processing control 218 could periodically poll the energy storage and sorting module 214 to check for relatively large magnitude pilot signals at phase offsets other than the phase offset with which the mobile unit is currently synchronized.

As discussed above, each sample received by matched filter 212 allows searcher 210 to effectively check for the presence of a pilot signal at a given phase offset. In a preferred embodiment, searcher 210 preferably acquires a sample about every 0.81 microseconds. Thus, to check for the presence of a pilot signal over the sequence of 32,768 phase offsets requires only about 26.67 milliseconds (ms) due to the incorporation of matched filter 212, which can advantageously search the entire pilot signal phase offset sequence in a relatively short period of time.

Additionally, matched filter 212 does not have to be programmable. As discussed above, the digital pattern of a pilot signal is the same for all base stations. It is the phase of the pattern that changes between base stations, and not the pattern itself. Thus, a single portion of this pattern can be permanently configured into matched filter 212. This advantageously allows matched filter 212 to be manufactured relatively at a relatively low cost. Also, because matched filter 212 does not have to be programmable, it can advantageously consume relatively little power.

Figure 6:
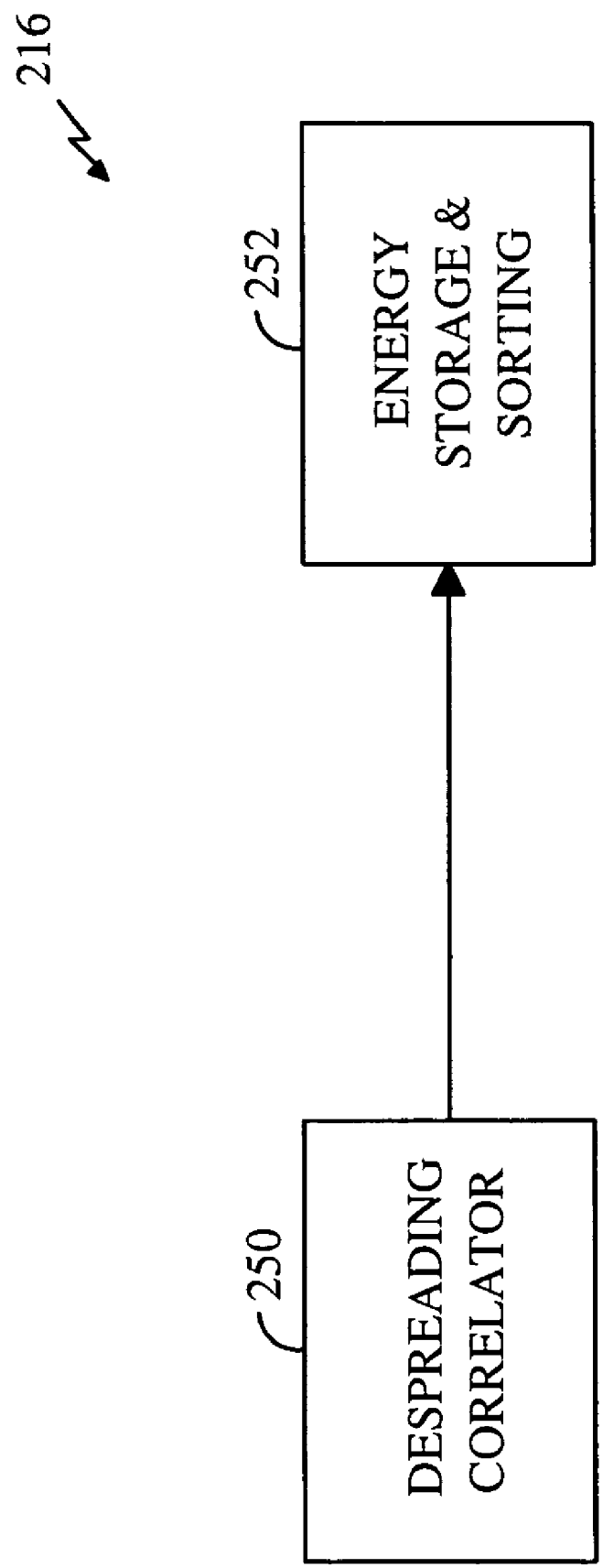
FIG. 6 is a block diagram of the primary searcher shown in FIG. 3 which can be used in parallel with the despreading matched filter shown in FIG. 5.
Figure 7:
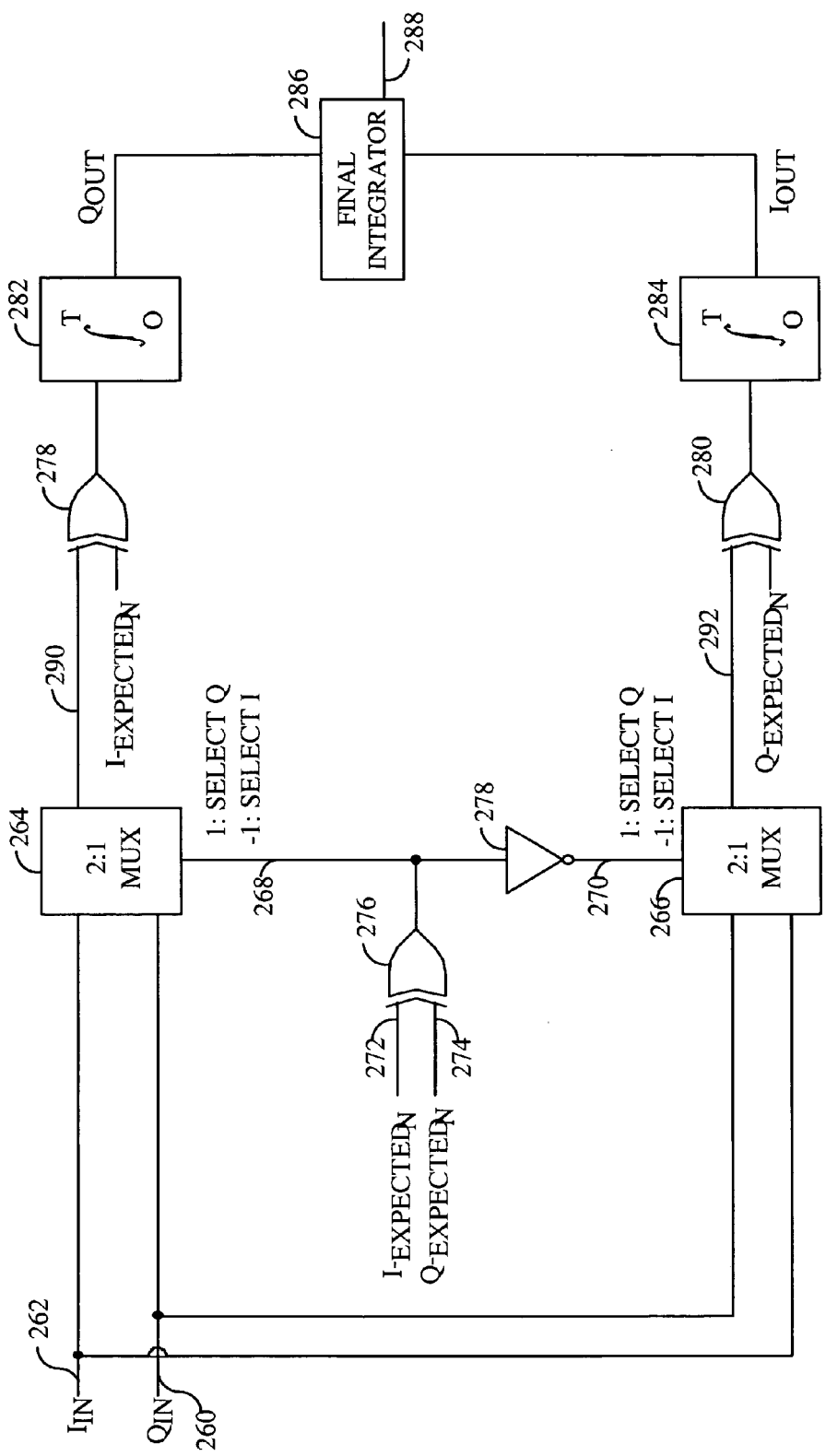
FIG. 7 is a schematic diagram of a despreading correlator that can be used in conjunction with the primary searcher shown in FIG. 5.

As shown in FIG. 4, matched filter 212 and energy storage and sorting module 214 is preferably used in parallel with primary searcher 216. FIG. 6 is a block diagram showing the components of primary searcher 216. Primary searcher 216 is similar to searcher 10 discussed in the Background and includes a despreading correlator 250 and an energy storage and sorting module 252. A schematic illustrating a preferred embodiment of despreading correlator 250 is shown in FIG. 7. Despreading correlator 250 correlates I- and Q-input signals with an expected, or searched for, I- and Q-input signal, as correlator 14 does with a single expected signal. Correlator 250 also despreads the pilot signal input, preferably using a QPSK scheme, to correct for any relative phase shifts that may have occurred to pilot signal 310 during transmission.

Despreading correlator 250 includes an I-input 262 and a Q-input 260, each of which are connected to a Q-multiplexer (Q-MIUX) 264 and an I-multiplexer (I-MUX) 266. The output of Q-MUX 264 is determined by the state of control line 268 and the output of I-MUX 264 is determined by the state of control line 270. The state of control lines 268 and 270 is determined by I-expected$_n$ input 272 and Q-expected$_n$ input 274 to exclusive-or (XOR) gate 276. I-expected$_n$ and Q-expected$_n$ are the I- and Q-components, respectively, of the pilot signal for which despreading correlator 250 is searching, that is, the expected pilot signal. Control line 270 contains an inverting buffer 278 to invert the state output by XOR gate 276. The output of Q-MUX 264 serves as one input into XOR gate 278. The other input to XOR gate 278 is I-expected$_n$, the I-component of the pilot signal for which primaiy searcher 216 is searching. The output of I-MUX 266 serves as one input into XOR gate 280. The other input to XOR gate 280 is Q-expected$_n$, the Q component of the pilot signal for which primary searcher 216 is searching.

The output of XOR gate 278 is fed into a Q-integrator 282 and the output of XOR gate 280 is fed into I-integrator 284. Both Q-integrator 282 and I-integrator 284 sum the signals on their respective inputs over a predetermined period of time. The outputs of I-integrator 282 and Q-integrator 284 are then fed into final integrator 286, which squares both the values from the outputs of the Q-integrator and I-integrator, and then adds the squared values together to produced an energy output at final output 288. This value can then be fed into energy storage and sorting module 252.

Despreading correlator 250 performs QPSK despreading and correlating on an input signal according to Chart 1 above. Despreading correlator 250 outputs the (In, Qn) required by chart 1 for an expected digital signal input (I-expected$_n$, Q-expected$_n$). For example, for (I-expected$_n$, Q-expected$_n$)=(1,-1), according to the second row of Chart 1, the I-outn, which is the signal routed to the I-integrator 282, should be -Qn, and the Q-outn, which is the signal routed to the Q-integrator, should be In. Thus, if the received Iin and Qin is the expected signal, that is (1,-1), then— Qn=1 and this value is routed to the I-integrator 282 and In=1, and this value is routed to the Q-integrator 284.

Despreading correlator performs this function as follows: For (I-expected$_n$, Q-expected$_n$)=(1,-1), the output of XOR gate 276 is 1. Thus, Q-MUX 264 selects the value of Q$_{in}$, -1, to feed XOR gate 278. If the sampled pilot signal matches this expected signal, that is (I$_{in}$, Q$_{in}$)=(1,-1), then I-expected$_n$=1 and XOR gate 278 outputs a 1 to maximally add to the sum performed by Q-integrator 282. On the I-channel, if the output of XOR 276 is 1, then, due to inverter 278, the control input to I-MUX 266 will have a value of -1. This places I$_{in}$ on I-MUX output 292. For I$_{in}$=1, and Q-expected=-1, the output of XOR gate 280 will be 1, which maximally adds to the sum performed by I integrator 284. Matching of other possible combinations of (I-expected$_n$, Q-expected$_n$) listed in Chart 1 similarly result in 1's being summed by integrators 282 and 284. In this way, the signals generated by Q-integrator 282 and I-integrator 284 will be relatively large when the pattern of the input signal (I$_{in}$, Q$_{in}$) matches the pattern of the expected signal (I-expectedn, Q-expectedn).

As noted above, the outputs of Q-integrator 282 and I-integrator 284 are fed into final integrator 286, and preferably squared and summed. Thus, if the input into despreading correlator 250 matches the expected signal, the energy output of final integrator 286 will be relatively high. Because to generate a high energy output, the input signal must match the expected signal, and the phase of the expected signal must be that of the signal that the primary searcher is attempting to detect.

Additionally, the time over which data for a given phase is to be collected to determine if there is a match is the integration time of integrators 282 and 284. Thus, to search for a given phase offset pilot signal, an expected signal of the same phase offset is fed into despreading correlator 250. Also, the integration time for integrators 282 and 284 is set to be equal to the amount of time which data for a given phase offset is to be collected. In this way, matches only for a given phase offset are being added to a final output energy at final output 288. Like matched filter 212, despreading correlator 250 takes input samples at the pilot signal frequency of preferably 1.2288 MHz. This is the same frequency that the expected signal is fed into despreading correlator 250.

Because 1's are routed to integrators 282 and 284 only when there is a match of an expected signal, if the received signal does not precisely match the expected signal, some -1's will be routed to integrator 282 and 284. This reduced the magnitude of the output of these integrators and, therefore, the output of despreading correlator 250 from final integrator 286. As discussed above with respect to FIG. 3A–3D, the stronger the pilot signal being received, the more actual chip values will match the ideal, predetermined pilot sequence chip values. Thus, the stronger the pilot signal being received, the more +1's are summed by integrators 282 and 284, and the fewer -1's that are summed thereby, and the higher magnitude of the output of despreading correlator 250. In this way, the magnitude of the output of despreading correlator provides an indication of the relative strength of a received pilot signal.

Each match will add only a relatively small amount to the total energy value at output 288. Therefore, correlator 250 must take enough samples to be compared with an expected signal to generate a high enough energy so that it may be reasonably determined whether a relatively strong pilot signal has been detected or there is just some random matching occurring. Thus, a given phase expected signal must be fed into despreading correlator 250 for a long enough period of time collect match data to allow for a reasonable determination of whether a relatively strong match has been detected. Although a predetermined number of consecutive samples must be taken before it can be determined whether a pilot signal is likely present at a given offset, it is possible to terminate the collection of samples prematurely if there is a clear lack of correlation prior to collecting the aforementioned predetermined number of consecutive samples. If, for example, a relatively high energy is being generated, samples can continue to be taken. If, however, a relatively low energy is being generated after a significant portion of the desired samples have been collected, the collected information in integrators 282, 284 and 286 can be dumped, the phase of the expected signal can be shifted, and the integrations can be restarted from time zero.

The final output 288 of despreading and correlating module 250 is preferably fed into energy storage and sorting module 252. This module can be substantially identical to energy storage and sorting module 214, shown in FIG. 4, and can operate in substantially the same manner. It is also contemplated that both matched filter 212 and despreading correlator 250 feed into the same energy storage and sorting module.

The output of energy storage and sorting module 252 is connected to processing control 218. Processing control 218 can use information stored in energy storage and sorting module 252 to determine whether the mobile unit is synchronized and receiving data signals from the most appropriate base station. As with energy storage and sorting module 214, processing control 218 can poll energy sorting and storage module 252 on a periodic basis or energy storage and sorting module 252 can otherwise alert processing control 218 of energies higher than a predetermined threshold value.

As discussed above, which phase offset pilot signal despreading correlator 250 is searching for is determined by the phase of the expected signal. Thus, it is possible to search at a first phase offset and then, if no significant energy is being detected, switch to searching at any other phase offset, which may be hundreds or thousands of chips from the first phase offset, simply by changing the phase of the reference signal. Additionally, while the maximum energy information would be obtained by a full 26.6 ms search, if no significant or unexpected energy is being detected at a given phase offset after only a portion of 26.6 ms, the search could be abandoned and a search could be initiated at another phase offset.

Thus, by using correlator 250 in parallel with matched filter 212, the correlator 250 can check phase offsets of base stations around the phase offset of the pilot signal with which the mobile unit is currently synchronized. Simultaneously, matched filter 212 can advantageously sweep through the entire sequence of phase offsets to check for any other strong pilot signals that correlator 250 might miss because it is checking only a small subset of the total sequence of pilot signal phase offsets. This advantageously provides the mobile unit with information concerning pilot signal strength over the entire sequence of pilot signal phase offsets in a relatively short period of time (~26.6 ms) while still allowing monitoring of high priority phase offsets (e.g., the phase offsets of base stations neighboring the currently synchronized base station) at an even higher rate (e.g. two, three or more neighboring phase offsets could be checked in ~26.6 ms).

While use of matched filter 212 in parallel with despreading and correlating module 250 provides the above advantages, it is also contemplated to use only matched filter 212 by itself. Additionally, it is within the ambit of the present invention to use more than one matched filter either in parallel with a correlator or without a correlator. If more than one matched filter is used, the amount of time required to search the entire sequence of pilot signal phase offsets can be reduced. For example, if two matched filters are used, they can be configured to search for pilot signals that are half of the total sequence of 32,768 phase offsets apart from each other, that is 16,384 chips apart from each other. In this way, the total pilot signal phase offset sequence space could be searched in half the time. It is also contemplated to use more than two matched filters in a similar manner.

Both the matched filter 212, correlator 250 and energy storage and sorting modules 252 and 214 can run substantially independent of processing control 218. Thus, high energy pilot signals can be detected and their energy and phase offsets stored using only minimal processing control resources. This can advantageously free processor control time for other important mobile unit functions.

It is to be understood that the present invention is not limited to the specific embodiments described above. Many widely different embodiments of the present invention may be constructed without departing from the spirit and scope of the present invention.

What is claimed is:

1. A periodic digital signal detector apparatus, comprising:
    means for matched filtering a portion of a periodic digital signal, said portion having a duration smaller than a duration of the periodic digital signal;
    means for determining a phase offset of the periodic digital signal based on matched filtering of said portion of the periodic digital signal;
    means for correlating the periodic digital signal;
    means for searching for a first match between the periodic digital signal and a first expected digital signal;
    means for providing a relative time when the first match occurs;
    means for determining an offset of the periodic digital signal based on the relative time and an absolute time; and
    means for providing said offset information to the correlator.

2. The apparatus of claim 1, wherein the means for searching for a first match between the periodic digital signal and a first expected digital signal comprises means for searching for a match over the full sequence comprising the periodic digital signal.

3. The apparatus of claim 1, further comprising means for providing a metric of a match quality.

4. The apparatus of claim 1, further comprising:
    means for searching for a second match between the periodic digital signal and a second expected digital signal; and
    means for providing an indication if the second match occurs.

5. The apparatus of claim 4, wherein the means for searching for a second match between the periodic digital signal and a second expected digital signal comprises:
    means for searching for the second match between the periodic digital signal and the second expected digital signal having a phase offset equal to a phase offset of a signal transmitted by a base station to which a mobile unit is currently synchronized.

6. The apparatus of claim 4, wherein the means for searching for a second match between the periodic digital signal and a second expected digital signal comprises a matched filter.

* * * * *